(12) United States Patent
Soriano et al.

(10) Patent No.: US 10,657,432 B1
(45) Date of Patent: May 19, 2020

(54) SYSTEM AND METHOD FOR MODIFYING RFID TAGS

(71) Applicant: Konica Minolta Laboratory U.S.A., Inc., San Mateo, CA (US)

(72) Inventors: Randy Cruz Soriano, San Leandro, CA (US); Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 16/197,631

(22) Filed: Nov. 21, 2018

(51) Int. Cl.
*G06K 19/06* (2006.01)
*G06K 19/077* (2006.01)
(52) U.S. Cl.
CPC .............................. *G06K 19/07773* (2013.01)
(58) Field of Classification Search
USPC .................................................. 235/487–494
See application file for complete search history.

(56) References Cited

U.S. PATENT DOCUMENTS

| | | | |
|---|---|---|---|
| 6,265,977 B1 | 7/2001 | Vega et al. | |
| 7,510,985 B1 | 3/2009 | Boenke et al. | |
| 2006/0232477 A1 | 10/2006 | Ollikainen | |
| 2008/0001829 A1 | 1/2008 | Rahola et al. | |
| 2008/0018477 A1* | 1/2008 | Forster | G06K 19/0717 340/572.7 |
| 2009/0108993 A1 | 4/2009 | Forster | |
| 2009/0166431 A1 | 7/2009 | Aoyama | |
| 2013/0134224 A1 | 5/2013 | Sabbah | |

FOREIGN PATENT DOCUMENTS

| | | |
|---|---|---|
| JP | 2010035789 A | 2/2010 |
| JP | 2010081276 A | 4/2010 |
| JP | 2014016884 A | 1/2014 |
| WO | WO 2013/072578 A1 | 5/2013 |

* cited by examiner

*Primary Examiner* — Jamara A Franklin
(74) *Attorney, Agent, or Firm* — Squire Patton Boggs (US) LLP

(57) ABSTRACT

An RFID tag having an initial range may be modified to have a reduced or increased range by printing a modification element over the antenna of the RFID tag. The modification element may function as an extension of the antenna or may function to shield the antenna. To allow for cost-efficient modification of RFID tags, multiple RFID tags may be secured on a substrate and modified together.

20 Claims, 10 Drawing Sheets

SYSTEM AND METHOD FOR MODIFYING RFID TAGS

FIELD

This disclosure relates generally to RFID devices, more particularly, to modification of RFID devices.

BACKGROUND

Radio frequency identification (RFID) is a technology that works on radio frequency signals. An RFID system often comprises three main components: (1) an RFID tag which stores data is usually attached to an article that one desires to identify and/or track; (2) an RFID reader that communicates with the RFID tag using radio frequency signals to obtain data from the RFID tag; and (3) a host data processor that uses the data obtained by the RFID reader from the RFID tag. If the RFID tag is within range of the radio frequency signals (radio waves), a communication link between the two RFID devices is established and the RFID tag replies with data to the RFID reader. Based on this reply, the RFID reader may identify the article.

There are various types of RFID tags. Passive RFID tags do not include a power source, such as a battery. Passive RFID tags rely on power derived from radio waves from the RFID reader to transmit a reply to the RFID reader. Active RFID tags include a power source to power its internal circuitry and to enable transmission of a reply to the RFID reader. Semi-passive RFID tags include a power supply to power its internal circuitry but relies on power derived from the radio waves from the RFID reader to transmit a reply to the RFID reader.

An important factor is range, which refers to the maximum distance between the RFID reader and RFID tag for a reliable communication link between the two RFID devices. The range is affected by various factors, such as background radio frequency noise, surrounding structures that may affect the radio waves from the RFID reader, antenna configurations of the reader and tag, relative orientation (angle) between the reader and tag, and carrier frequency. RFID systems may operate in different frequency bands. In the low frequency (LF) band, a carrier frequency of 125 kHz or 134 kHz, for example, may provide a range up to 10 cm. In the high frequency (HF) band, a carrier frequency of 13.58 MHz, for example, may provide a range up to 1 meter. In the ultra high frequency (UHF) band, a carrier frequency within 860-960 MHz, for example, may provide a range up to 15 meters.

RFID tags are used on a great variety of articles. The articles can be items of clothing for sale in a retail shop, medical devices, and individual components used in a factory, just to name a few. It is often the case that RFID tags manufactured in bulk have the same range. However, articles on which the RFID tags are attached might be stacked within a box, and the box may be surrounded by other boxes when the RFID tags must be read by an RFID reader. To ensure reliable communication, the RFID tags may be over-designed or conservatively designed to work in the most extreme situation that is expected during the useful life of the RFID tags, but such an approach may increase costs significantly. This scenario and others present a need for a system and method that allows for cost-efficient modification of an RFID tag to customize its range.

SUMMARY

Briefly and in general terms, the present invention is directed to a system and method for modifying one or more RFID tags to reduce or increase its range.

In aspects of the invention, a method is for modifying at least one RFID tag comprising a chip on a first side of a substrate and an antenna configured to transmit data from the chip, the RFID tag having an initial range. The method comprises modifying the RFID tag to have a modified range, the modifying performed by printing a modification element over the antenna of the RFID tag, the modified range being greater than or less than the initial range.

In aspects of the invention, a system is for modifying at least one RFID tag secured on a substrate, the RFID tag having a chip on a first side of the substrate and an antenna configured to transmit data from the chip, the RFID tag having an initial range. The system comprises a first printer configured to receive the RFID tag secured on the substrate. The system comprises a computer configured to control the first printer to modify the RFID tag, while secured on the substrate, to have a modified range by instructing the first printer to print a modification element over the antenna of the RFID tag, the modified range being greater than or less than the initial range.

The features and advantages of the invention will be more readily understood from the following detailed description which should be read in conjunction with the accompanying drawings.

DETAILED DESCRIPTION

Figure 1:
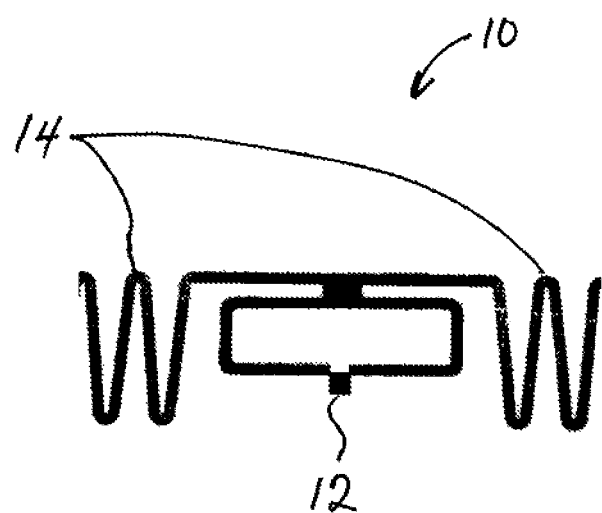
FIG. 1 is a plan view showing an example RFID tag before modification.

Referring now in more detail to the drawings for purposes of illustrating non-limiting examples, wherein like reference numerals designate corresponding or like elements among the several views, there is shown in FIG. 1 example RFID tag 10 comprising chip 12 and antenna 14 configured transmit data from the chip. Chip 12 is a silicon device (integrated circuit) having pads that are operatively connected to antenna 14, which is a conductive circuit. In the illustrated example, antenna 14 is a dipole (common for UHF) although other antenna designs are possible, such as coiled shapes (common for HF). Circuity provided by chip 12 may include modulators and voltage regulators, as known in the art. Chip 12 may have control logic that includes data encoding and decoding functions, as known in the art. Chip 12 includes memory, which may be an EEPROM for example, for storing information. Such information may be associated with an article on which the RFID tag will be attached at a later time. Chip 12 and antenna 14 are secured to a substrate, which may be made of paper (e.g., cardstock), polymer film, fabric, or other material.

RFID tag 10 will be modified to increase or reduce its range by printing a modification element over antenna 14. In FIG. 1, RFID tag 10 is in an unmodified state. That is, RFID tag 10 has not been subjected to modification described below. While in an unmodified state, RFID tag 10 is functional in the sense it is capable of powering circuits of chip 12 in response radio waves from an RFID reader. RFID tag 10 has a range, which is the maximum distance between RFID tag 10 and an RFID reader for a for a reliable communication link between the tag and reader.

The term "initial range" refers to the range of RFID tag 10 while in its unmodified state. By definition, an initial range is greater than zero. The term "modified range" refers to the range of RFID tag 10 while in its modified state, which is the state resulting from modification by printing a modification element over antenna 14. The modification element includes metal or graphite, for example. The modification element can have a maximum thickness up to 0.13 mm (about 5 mil) or up to 0.25 mm (about 10 mil), for example.

The range of the RFID tag may be affected by variations in background radio frequency noise (electromagnetic interference), surrounding structures, and other conditions. Thus, the initial range may be determined by testing before RFID tag 10 is modified, such as by using a particular sensor using a known frequency and power under known test conditions (e.g., known amount of background RF noise, known orientation (angle) between reader and tag, etc.). For example, the sensor used for this purpose may be an RFID reader or other type of sensor.

Various test techniques may be used to determine the initial and modified ranges. In a technique referred to herein as position thresholding, the distance of the sensor from RFID tag 10 is adjusted while the sensor emits radio waves. The distance is adjusted until the radio waves induce RFID tag 10 to send a response to the sensor, or until the sensor detects a backscatter signal from the RFID tag. In a technique referred to herein as signal thresholding, the position of the sensor may be fixed (sensor does not move relative to the RFID tag) while characteristics of the radio waves from the antenna of the sensor are adjusted. The radio wave characteristics are adjusted until the radio waves induce RFID tag 10 to send a response to the sensor, or until the sensor detects a backscatter signal from the RFID tag. The radio wave characteristics that result in the response may be used, in formulas and models known in the art, to calculate a value of the initial range.

The initial range is relative to the modified range, which may be determined by testing after RFID tag 10 is modified. Signal thresholding, position thresholding, or other test technique may be used to determine the modified range. For position thresholding, the sensor and test conditions to determine the modified range may be the same as or similar to those used to determine the initial range.

As indicated above, the range of RFID tag 10 depends on a variety of factors. Thus, values for the initial and modified ranges may vary depending on the sensor used for testing. For example, when using one type of sensor under certain test conditions, the initial and modified ranges may be 1.2 meters and 2 meters, respectively. When using another type of sensor under different test conditions, the initial and modified ranges may be 1.5 meters and 2.1 meters, respectively. The initial and modified ranges may be based on multiple tests, and the results of the tests may be averaged to determine initial and modified ranges.

Figure 2:
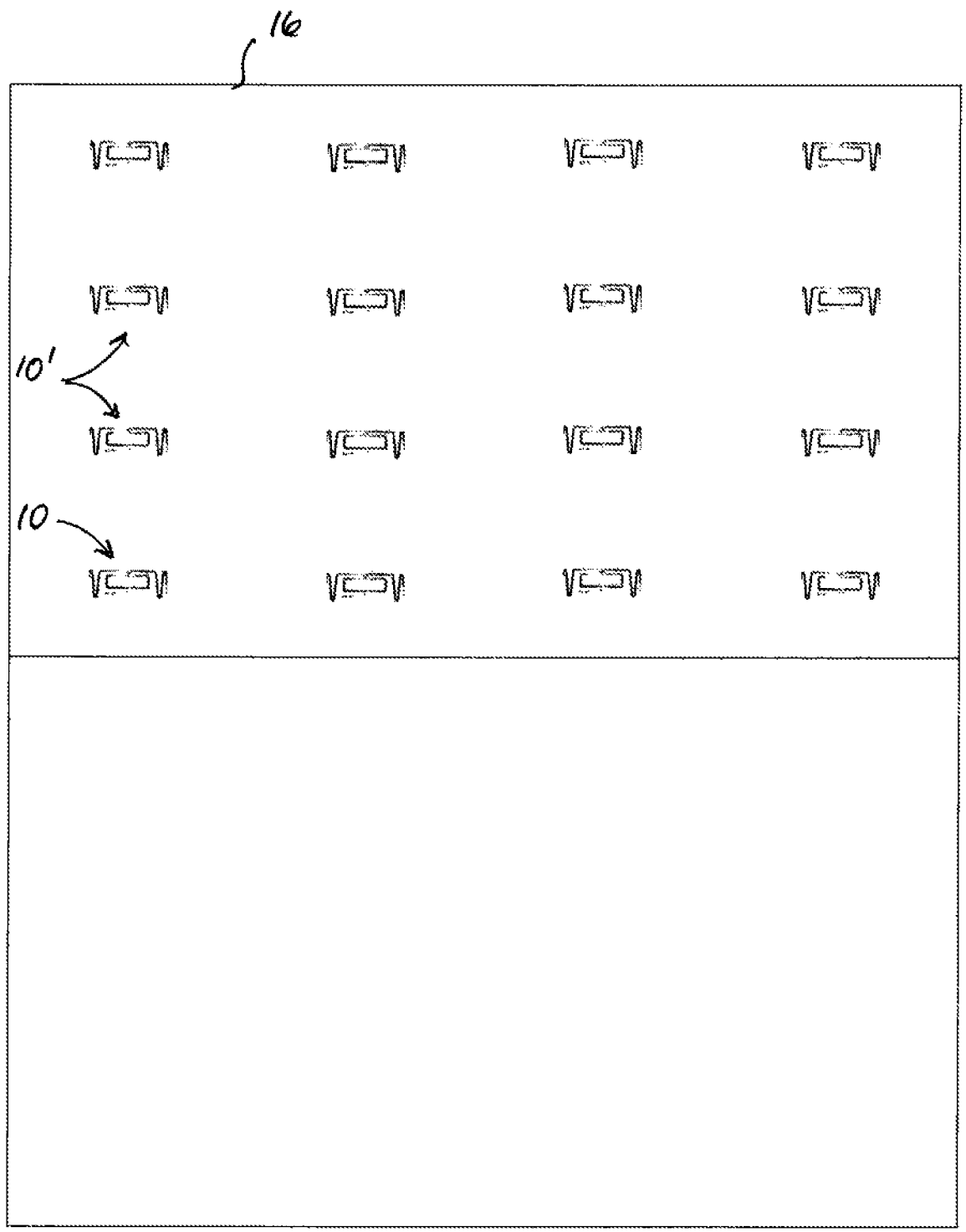
FIG. 2 is a plan view showing an example substrate on which is secured the RFID tag and other RFID tags before modification.
Figure 3:
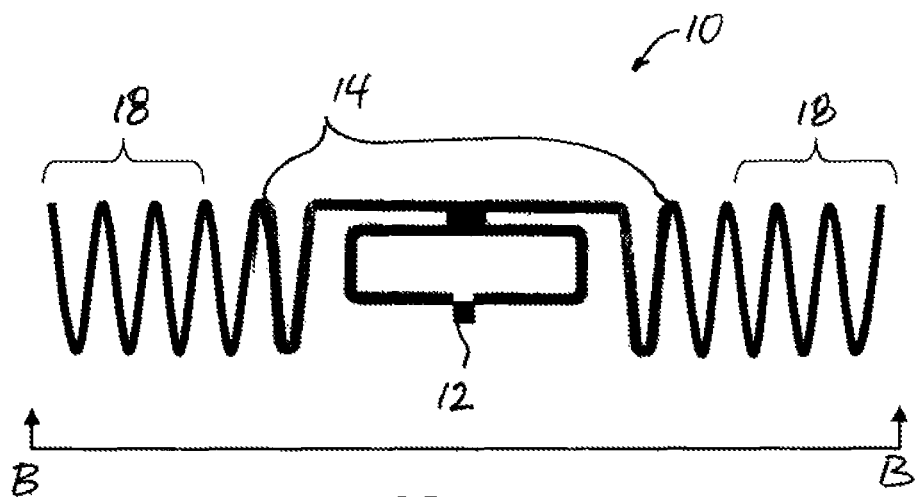
FIGS. 3 and 4 are plan views showing example modification elements applied to the RFID tag to increase and decrease range.
Figure 4:
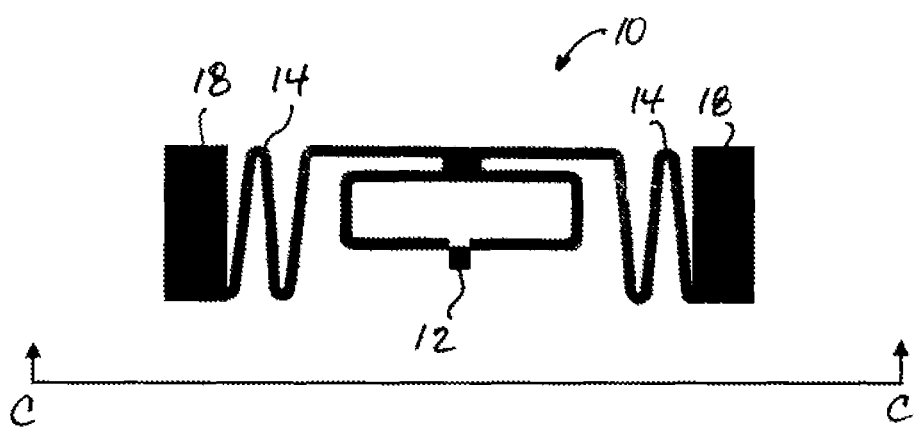

As shown in FIG. 2, substrate 16 may carry RFID tag 10 and other RFID tags 10' in unmodified states. Other RFID tags 10' may be identical to or different from RFID tag 10. In this way, multiple RFID tags may be modified together for efficiency. Modification involves printing modification element 18 over antenna 14, as shown in FIGS. 3 and 4. Modification element 18 is made of an electrically conductive material. The conductive material for modification element 18 may be the same or similar material that was used to form antenna 14. For example, the conductive material may be a conductive ink or a conductive paste containing metal particles and/or graphite particles.

In FIG. 3, modification element 18 has been printed over antenna 14 in such a way that modification element 18 makes electrical contact with antenna 14 and increases the range of RFID tag 10. Electrical contact allows modification element 18 to function as an extension of antenna 14. The modified range is greater than the initial range. The modified range may be at least 20% or at least 30% greater than the initial range. In the illustrated example, modification element 18 enlarges antenna 14. Modification element 18 increases the length of antenna 14. Modification element 18 may increase the power gain of antenna 14. The gain is expressed relative to an ideal isotropic antenna or relative to a dipole antenna used as a reference, and may be measured using techniques known in the art.

As previously mentioned, the RFID tag may have a coil shaped antenna. If the RFID tag has a coil shaped antenna, modification element 18 may increase or decrease the number of coil loops in the antenna.

In FIG. 4, modification element 18 has been printed over antenna 14 in such a way that modification element 18 decreases the range of RFID tag 10. The modified range is less than the initial range. The modified range may be at least 20% or at least 30% less than the initial range. Modification element 18 makes electrical contact with antenna 14 such that the number of bends in the antenna 14 are effectively reduced, or modification element 18 does not make electrical contact with antenna 14 such that a portion of antenna 14 is shielded from radio waves by modification element 18. An insulation layer (e.g., layer 70 of FIG. 11) may exist between modification element 18 and antenna 14 to prevent electrical contact. For example, modification element 18 may decrease the power gain of antenna 14.

Figure 5:
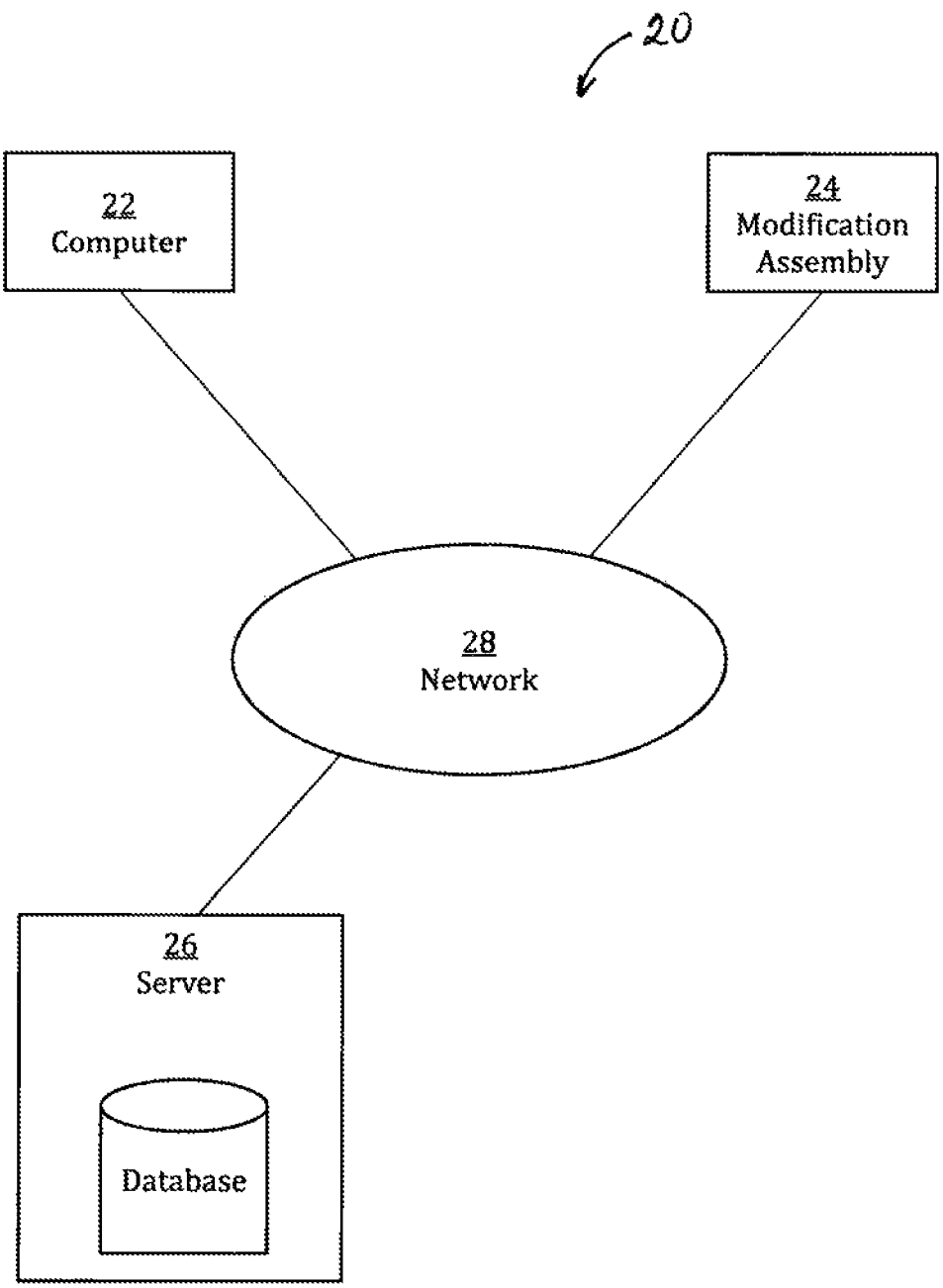
FIG. 5 is a diagram showing an example system for modifying the RFID tag.

FIG. 5 shows example system 20 for increasing or reducing the range of RFID tag 10. System 20 includes computer 22, modification assembly 24, and server 26. These elements of system 20 communicate via network 28. For example, network 28 may be local area network, wide area network, and/or the Internet. Computer 22 may be a tablet computer, laptop computer, desktop computer, or workstation computer.

Alternatively, computer 22 and/or server 26 may be integrated into and form parts of modification assembly 24. Server 26 may be integrated into and form part of computer 22. In further aspects, system 20 includes RFID tag 10 secured on substrate 16. System 20 may include RFID tag 10 and other RFID tags 10' secured on substrate 16.

Figure 6:
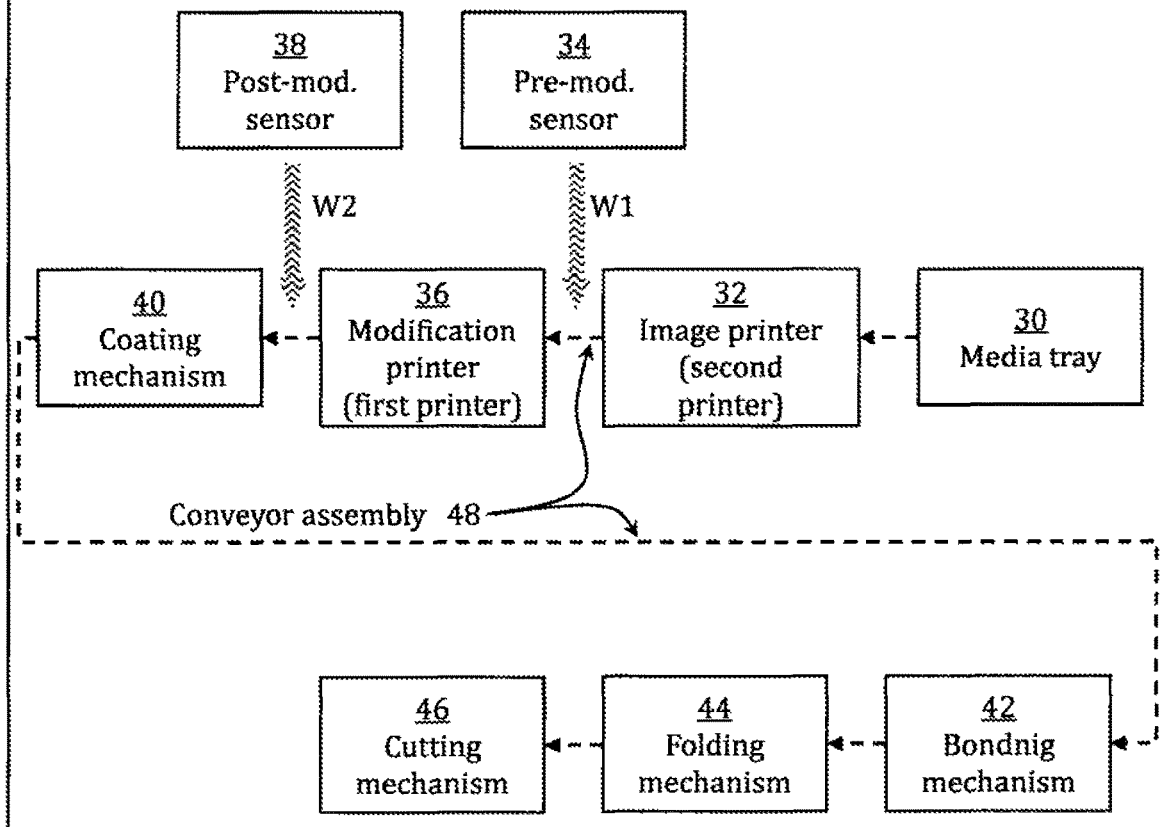
FIG. 6 is a diagram showing an example modification assembly of the system.

As shown in FIG. 6, modification assembly 24 includes media tray 30, image printer 32 (second printer), pre-modification sensor 34, modification printer 36 (first printer), post-modification sensor 38, coating mechanism 40, bonding mechanism 42, folding mechanism 44, cutting mechanism 46, and conveyor assembly 48. Media tray 30 holds substrate 16 before RFID tag 10 is modified. Conveyor assembly 48 (depicted as a dotted line) extends through modification assembly 24 and includes motors, guides, and rollers, as are known in the art. Conveyor assembly 48 takes substrate 16 from media tray 30 and then conveys substrate 16 across or through image printer 32, pre-modification sensor 34, modification printer 36, post-modification sensor 38, coating mechanism 40, bonding mechanism 44, and folding mechanism 44.

In alternative aspects, modification assembly 24 includes RFID tag 10 secured on substrate 16. Modification assembly 24 may include RFID tag 10 and other RFID tags 10' secured on substrate 16.

In alternative aspects, any of image printer 32, pre-modification sensor 34, post-modification sensor 38, coating mechanism 40, bonding mechanism 44, folding mechanism 44, and cutting mechanism 46 may be separated from modification assembly 24 while remaining as part(s) of system 20. That is, any of image printer 32, pre-modification sensor 34, modification printer 36, coating mechanism 40, bonding mechanism 44, folding mechanism 44, and cutting mechanism 46 may be present outside of modification assembly 24.

In alternative aspects, any of image printer 32, pre-modification sensor 34, post-modification sensor 38, coating mechanism 40, bonding mechanism 44, folding mechanism 44, and cutting mechanism 46 may be eliminated from system 20.

Conveyor assembly 48 conveys substrate 16 from media tray 30 to image printer 32 (second printer). Image printer 32 prints an image on the second side of substrate 16. The printed image may be text and/or graphics, such as a machine-readable barcode. Image printer 32 may use electrostatic, ink-jet, stamping, roller, or other technique to print the image. Structures for these techniques are known in the art and need not be described herein.

Figure 7:
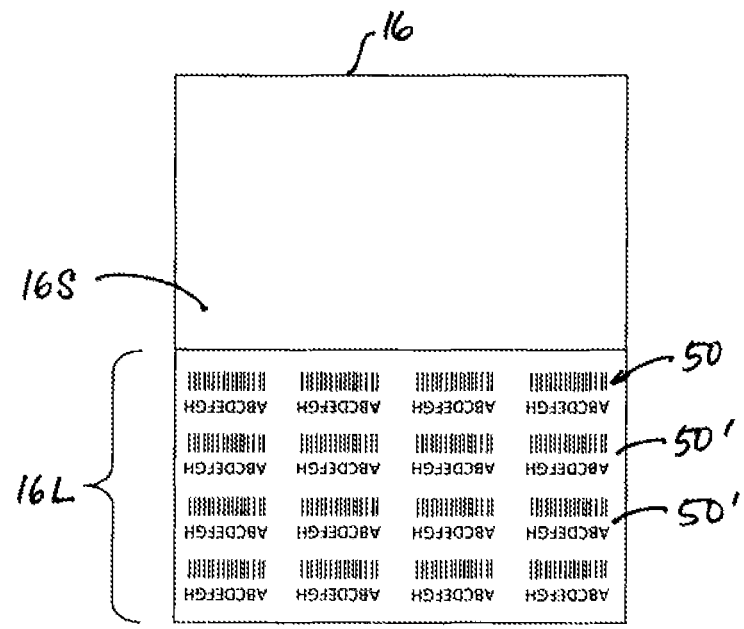
FIG. 7 is a plan view showing images printed on one side of the substrate.

FIG. 7 shows example image 50 printed by image printer 32 on second side 16S of substrate 16. Image 50 corresponds to RFID tag 10, as will become apparent from the folding step described below. When other RFID tags 10' are on the first side of substrate 16, image printer 32 prints other images 50' corresponding to other RFID tags 10'. Image 50 and other images 50' may be identical, or they may be different from each other. The images 50, 50' are confined to lower half 16L of substrate 16.

Referring again to FIG. 6, conveyor assembly 48 conveys substrate 16 from image printer 32 to pre-modification sensor 34. Pre-modification sensor 34 is used to conduct a test to determine the initial range of RFID tag 10 in an unmodified state. Pre-modification sensor 34 emits radio waves W1 toward RFID tag 10 during the test. Position thresholding, signal thresholding, or another test technique may be used to determine the initial range. Pre-modification sensor 34 may be an RFID reader. RFID readers and sensors for this purpose are known in the art need not be described herein.

Next, conveyor assembly 48 conveys substrate 16 from pre-modification sensor 34 to modification printer 36 (first printer). Modification printer 36 prints modification element 18 over antenna 14. For example, modification printer 36 may print modification element 18 as described for FIG. 3 or FIG. 4. Modification printer 36 may use electrostatic, ink-jet, stamping, rolling, or other technique. Structures for these techniques are known in the art and need not be described herein.

Figure 8:
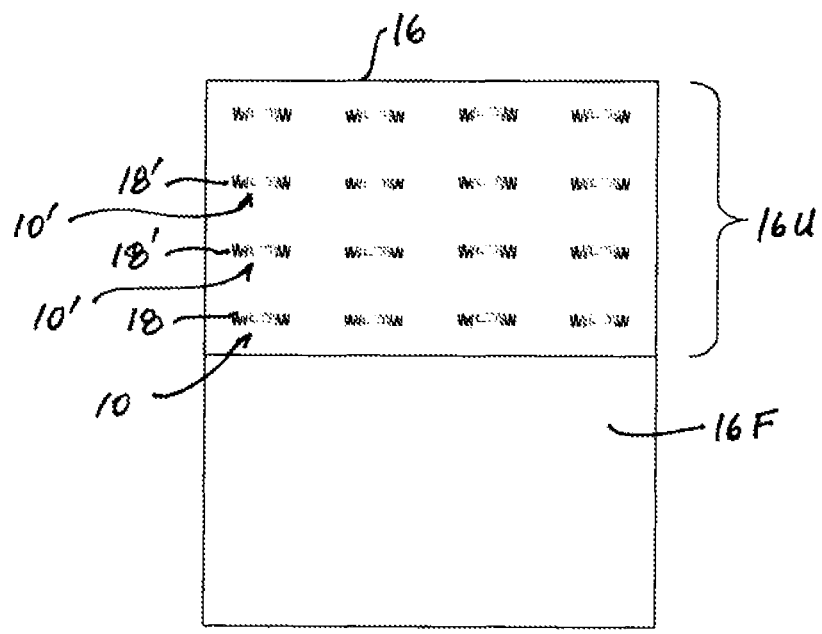
FIG. 8 is a plan view showing modification elements printed over the RFID tag on the other side of the substrate.

FIG. 8 shows example modification element 18 printed by modification printer 36 (first printer) on first side 16F of substrate 16. Modification printer 36 printed modification element 18 over the antenna of RFID tag 10. Modification printer 36 also printed modification elements 18' over respective antennas of other RFID tags 10'. Modification element 18 and modification elements 18' may be identical, or they may be different from each other. Note that the RFID tags are confined to upper half 16U of substrate 16.

Referring again to FIG. 6, conveyor assembly 48 conveys substrate 16 from modification printer 36 (first printer) to post-modification sensor 38. Post-modification sensor 38 is used to conduct a test to determine the modified range of RFID tag 10. Post-modification sensor 38 emits radio waves W2 toward RFID tag 10 during the test. Position thresholding, signal thresholding, or another test technique may be used to determine the modified range. Post-modification sensor 38 may be an RFID reader. RFID readers and sensors for this purpose are known in the art need not be described herein.

In alternative aspects, post-modification sensor 38 is eliminated, and pre-modification sensor 34 is used to determine the modified range of RFID tag 10. For example, conveyor assembly 48 may return substrate 16 to pre-modification sensor 34, or pre-modification sensor 34 may be configured to move on a track to a position downstream of modification printer 36.

Next within FIG. 6, conveyor assembly 48 conveys substrate 16 from post-modification sensor 38 to coating mechanism 40. Coating mechanism 40 applies protective coating 56 (FIG. 9) on first side 16F of substrate 16 such that a bottom surface of coating 56 covers and contacts the chips, antennas, and modification elements of all RFID tags on substrate 16. Coating 56 may be a thin film that protects the underlying electronic components from moisture, salt, chemicals, temperature changes, and other conditions that may damage the components. Coating 56 may be applied as a wet substance that is dried by coating mechanism 40. When dried, coating 56 may function as an electrical insulator and/or a moisture barrier. Coating 56 may be applied as a dry polymer film that functions as an electrical insulator and/or a moisture barrier. Coating mechanism 40 may use spraying, brushing, stamping, dipping, rolling, or other technique to apply coating 56. Structures for these techniques are known in the art and need not be described herein.

Figure 9:
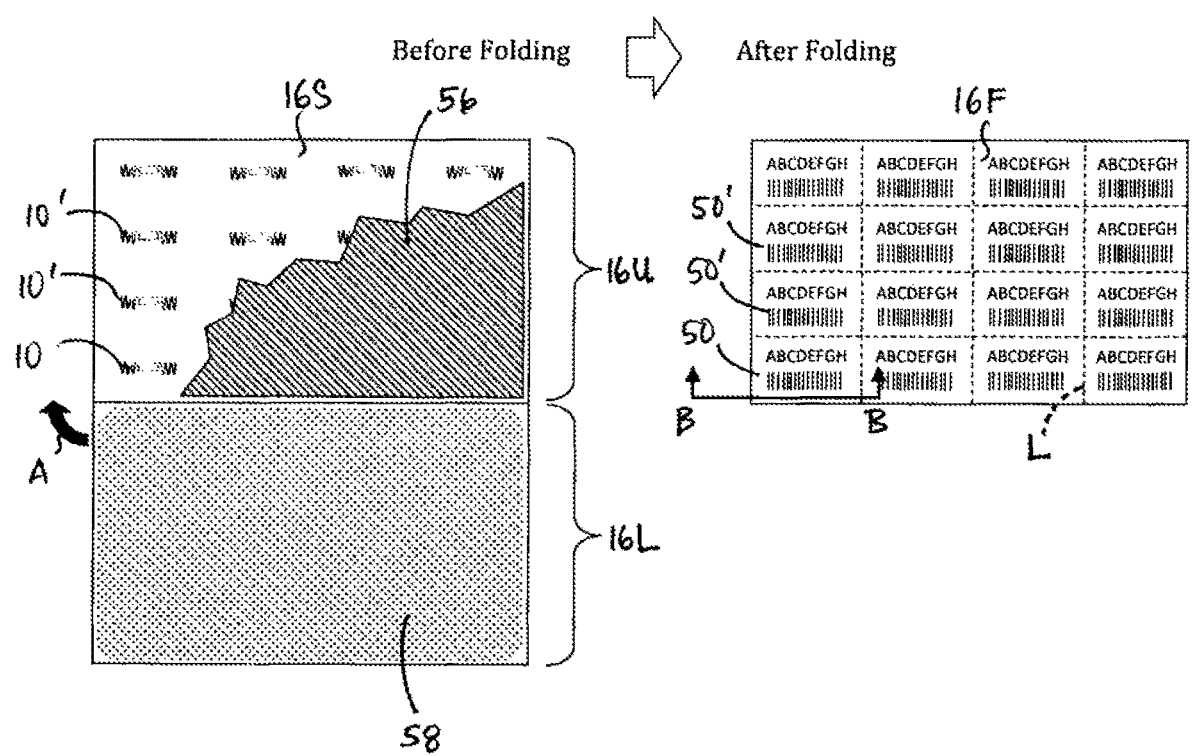
FIG. 9 is a plan view showing a coating and an adhesive applied on the same side of the substrate as the RFID tags, and showing the result after the substrate is folded.

In FIG. 9, coating 56 is illustrated as having been partially removed so that some of the RFID tags are visible for purposes of discussion herein. It is to be understood that coating 56 covers all the RFID tags.

Referring again to FIG. 6, conveyor assembly 48 conveys substrate 16 from coating mechanism 40 to bonding mechanism 42. Bonding mechanism 42 applies adhesive 58 on first side 16F of substrate 16. In FIG. 9, adhesive 58 is confined to lower half 16L of substrate 16. Bonding mechanism 42 may apply adhesive 58 as a wet or tacky substance. Bonding mechanism 42 may use spraying, brushing, stamping, rolling, or other technique to apply adhesive 58. Structures for these techniques are known in the art and need not be described herein.

Figure 10:
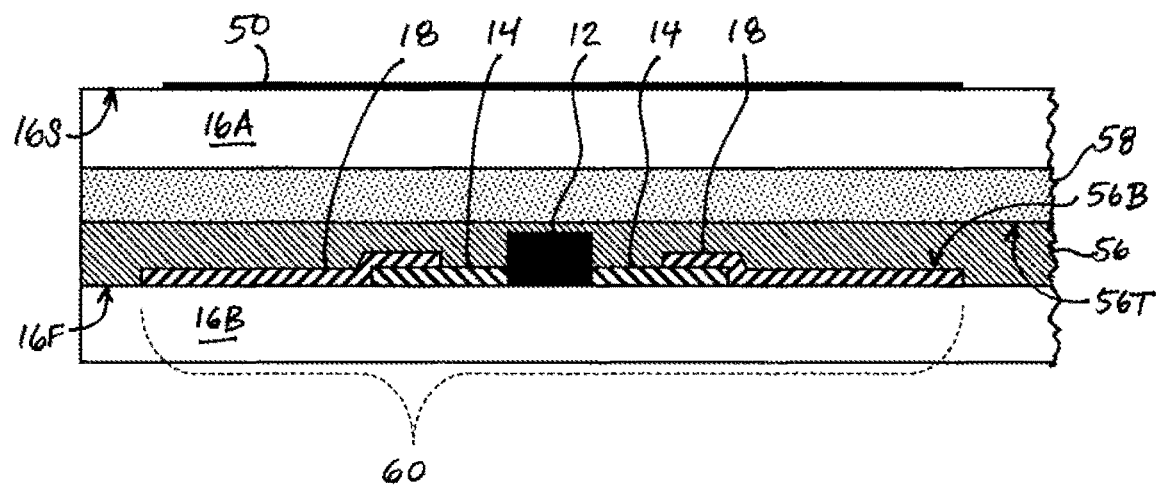
FIG. 10 is a side view along the direction of arrows B-B in FIGS. 3 and 9, showing an example modification element that modifies the RFID tag.

Next, conveyor assembly 48 conveys substrate 16 from bonding mechanism 42 to folding mechanism 44. Folding mechanism 44 folds first side 16F of substrate 16 onto itself as indicated by arrow A. Folding mechanism 44 folds substrate 16 in half. Note that images 50, 50' (FIG. 0.7) are at lower half 16L of the substrate, and RFID tags 10, 10' are on upper half 16U of the substrate. Thus, when folding mechanism 44 folds substrate 16, image 50 on second side 16S of the substrate covers area 60 occupied by RFID tag 10 (including chip 12 and antenna 14) and modification element 18 on first side 16F of the substrate, as shown in FIG. 10. That is, RFID tag 10 and its associated image 50 become aligned. Similarly, each of the other RFID tags 10' and its associated image 50' become aligned.

Next, conveyor assembly 48 conveys substrate 16 from folding mechanism 44 to cutting mechanism 46. Cutting mechanism 46 separates each of RFID tag 10 and other RFID tags 10' by cutting substrate 16 along dotted lines L in FIG. 9. Cutting mechanism 46 include a blade or cutting die for cutting along dotted lines L.

In alternative aspects, conveyor assembly 48 may not extend to cutting mechanism 46. Conveyor assembly 48 may terminate at any one of image printer 32 (second printer), pre-modification sensor 34, modification printer 36 (first printer), post-modification sensor 38, coating mechanism 40, bonding mechanism 44, and folding mechanism 44. After the point of termination, a person may convey substrate 16 to the next part of modification assembly 24.

In alternative aspects, pre-modification sensor 34 is not located between image printer 32 and modification printer 36. Instead of the location shown in FIG. 6, pre-modification sensor 34 is located before (upstream of) coating mechanism image printer 32. For example, pre-modification sensor 34 may be located between image printer 32 and media tray 30.

In alternative aspects, post-modification sensor 38 is not located between modification printer 36 and coating mechanism 40. Instead of the location shown in FIG. 6, post-modification sensor 38 may be located after (downstream of) coating mechanism 40. For example, post-modification sensor 36 may be located after cutting mechanism 46.

FIG. 10 is a partial side view in the direction of arrows B-B in FIGS. 3 and 9. FIG. 10 shows a possible configuration of a modified RFID tag after substrate 16 is folded. Modification element 18, chip 12, and antenna 14 are between two portions 16A, 16B of substrate 16. Bottom surface 56B of coating 56 covers and contacts modification element 18, chip 12, and antenna 14. Adhesive 58 is on top surface 56T of coating 56. Adhesive 58 keeps the modified RFID tag sealed and protected between two portions 16A, 16B of substrate 16. Image 50 on second side 16S of substrate 16 covers area 60 occupied by modification element 18, chip 12, and antenna 14 on first side 16F of substrate 16.

Figure 11:
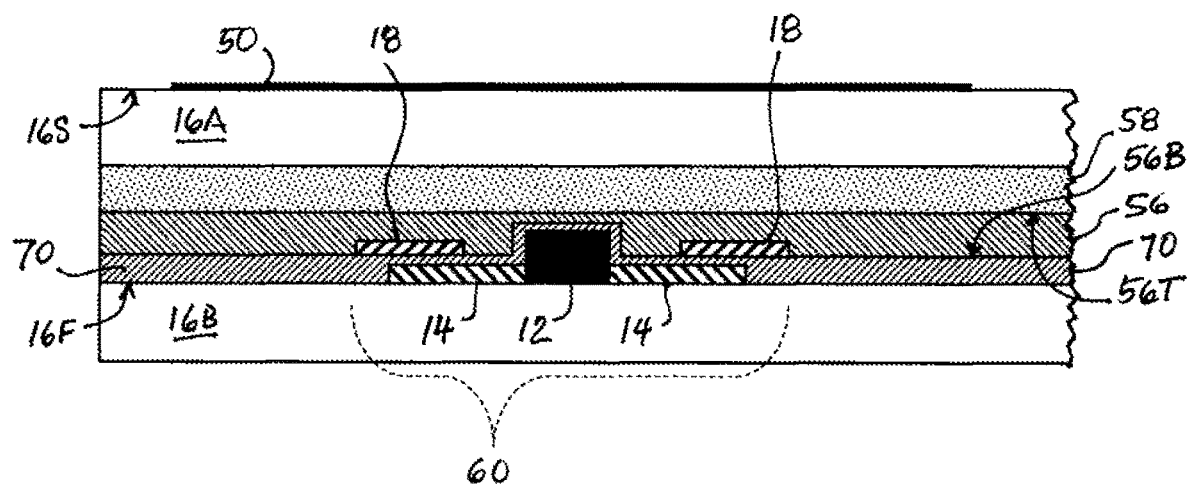
FIG. 11 is a side view along the direction of arrows C-C in FIG. 4, showing another example modification element that modifies the RFID tag.

In alternative aspects, coating 56 contacts modification element 18 but does not contact chip 12 and antenna 14, as shown in FIG. 11. FIG. 11 is a partial side view in the direction of arrows C-C in FIG. 4. FIG. 11 shows a possible configuration of a modified RFID tag after substrate 16 is folded. FIG. 11 is the same as FIG. 10 except for the presence of insulation layer 70, which covers and contacts chip 12 and antenna 14. Insulation layer 70 may be a thin film that protects the underlying electronic components from moisture, salt, chemicals, temperature changes, and other conditions that may damage the components. Insulation layer 70 may be present when substrate 14 is placed in media tray 30, or a mechanism (similar to coating mechanism 40) may be present between media tray 30 and modification printer 36 for the purpose of applying insulation layer 70. Modification element 18 is printed over antenna 14, though there is no conductive path from modification element 18 to antenna 14 because of insulation layer 70. Absence of a conduct path allows modification element 18 to shield a portion of antenna 14 from radio waves from an RFID reader. Thereafter, coating mechanism 40 applies coating 56 over modification element 18, chip 12, and antenna 14. Bottom surface 56B of coating 56 contacts modification element 18 but does not contact chip 12 and antenna 14 because of insulation layer 70.

Referring again to FIG. 5, computer 22 includes processors and memory that allow it to execute computer readable instructions for controlling modification assembly 24 and for performing processes described below.

Pre-modification sensor 34 (FIG. 6) is configured to determine the initial range (Ri) of RFID tag 10, as described above. Computer 22 stores a target range (Rt) and is configured to compare the determined initial range to the target range before instructing modification printer 36 (first printer) to print modification element 18. Computer 22 is configured to determine a configuration of modification element 18 according to a result of the comparison. Thereafter, computer 22 controls modification printer 36 to print modification element 18 over antenna 14 of RFID tag 10 according to the determined configuration.

TABLE I is an example lookup table that may be stored in computer 22 and which computer 22 uses to determine a configuration of modification element 18. The lookup table shows a relationship between additional range (R) and additional antennal length (L) for a particular type of RFID tag having a particular antenna configuration and chip. In this example, computer 22 calculates the additional range from Equation 1 below.

$$R = Rt - Ri \qquad \text{(Eq. 1)}$$

An equation other than Equation 1 may be used to determine R. For example, weighting or correction factors "a" and "b" may be applied according to Equation 2 below.

$$R = (a \cdot Rt) - (b \cdot Ri) \qquad \text{(Eq. 2)}$$

The additional range (R) represents a comparison of the initial range (Ri) and target range (Rt). The lookup table may be developed empirically from many tests performed before the RFID tag is modified. Computer 22 may store many tables, each table being for a particular type of RFID tag. Computer 22 may receive information on the type of RFID tag. In response, computer 22 matches the received information to one of the lookup tables, applies the value of R to the lookup table to determine a value for L. In this way, computer 22 determines L, which represents the configuration of modification element 18.

In alternative aspects, the lookup table may come from the database of server 26. For example, computer 22 may transmit information on the type of RFID tag to server 26, and server 26 matches the information to one of the lookup tables stored in its database, and then transmits the lookup table or a value for L to computer 22.

TABLE I

| Additional Range, R | Additional Antenna Length, L |
| --- | --- |
| −1 meter | −10 mm |
| 1 meter | 20 mm |
| 2 meters | 30 mm |
| 3 meters | 60 mm |

In alternative aspects, the relationship between R and L for a particular type of RFID tag may be in a theoretical or empirical model (equation), instead of a lookup table. Several models may be stored in the database of server 26. For example, computer 22 may transmit a value for R and information on the type of RFID tag to server 26. In response, server 26 matches the information to one of the models stored in its database, applies the value of R to the model to calculate a value for L, and transmits the value for L to computer 22. In this way, computer 22 determines L, which represents the configuration of modification element 18.

For example, if the target range is Rt=7 meters and the initial range is Ri=4 meters, then computer 22 may compute the additional range as R=7−4=3 meters according to Equation 1. Using a lookup table or model, computer 22 determines the configuration of modification element 18 to be L=60 mm. Thereafter, computer 22 instructs modification printer 36 to print modification element 18 as a conductive trace that provides 60 mm additional length to the pre-existing length of antenna 14. In addition to or as an alternative to length, the lookup table (or model) may include other characteristics for the configuration of modification element 18. Other characteristics include without limitation: width for printing the conductive trace, the number of meanders or bends of the conductive trace, the number of loops formed by the conductive trace (potentially for an RFID tag having a pre-existing coil design for inductive coupling), the thickness of the trace, and the area size of a paddle tip at the end of the trace (potentially for an RFID tag having a pre-existing coil design for backscatter coupling).

In another example, if the target range is Rt=3 meters and the initial range is Ri=4 meters, then computer 22 may compute the additional range as R=3−4=−1 meter according to Equation 1. Using a lookup table or model, computer 22 determines the configuration of modification element 18 to be L=−10 mm. The negative value means that the effective length of the antenna of the RFID tag should be reduced by 10 mm. Thereafter, computer 22 instructs modification printer 36 to print modification element 18 as a radio wave shield that covers a 10 mm length of antenna 14. In addition to or as an alternative to length, the lookup table (or model) may include other characteristics for the configuration of modification element 18. Other characteristics include without limitation: the number of meanders or bends to be covered by modification element 18, and the number of loops to be covered by modification element 18. Thus, for example, computer 22 may instruct modification printer 36 to print modification element 18 that reduces the number or bends or loops in antenna 14.

The target range may be manually entered into or transmitted to computer 22. The target range may be specified by a customer. The target range may be constant (the same) for all RFID tags on substrate 14, in which case the printed configuration of modification element 18 may be identical for all the RFID tags on substrate 14. The target range may vary among the RFID tags on substrate 14, in which case the printed configuration of modification element 18 may vary among the RFID tags on substrate 14.

Figure 12:
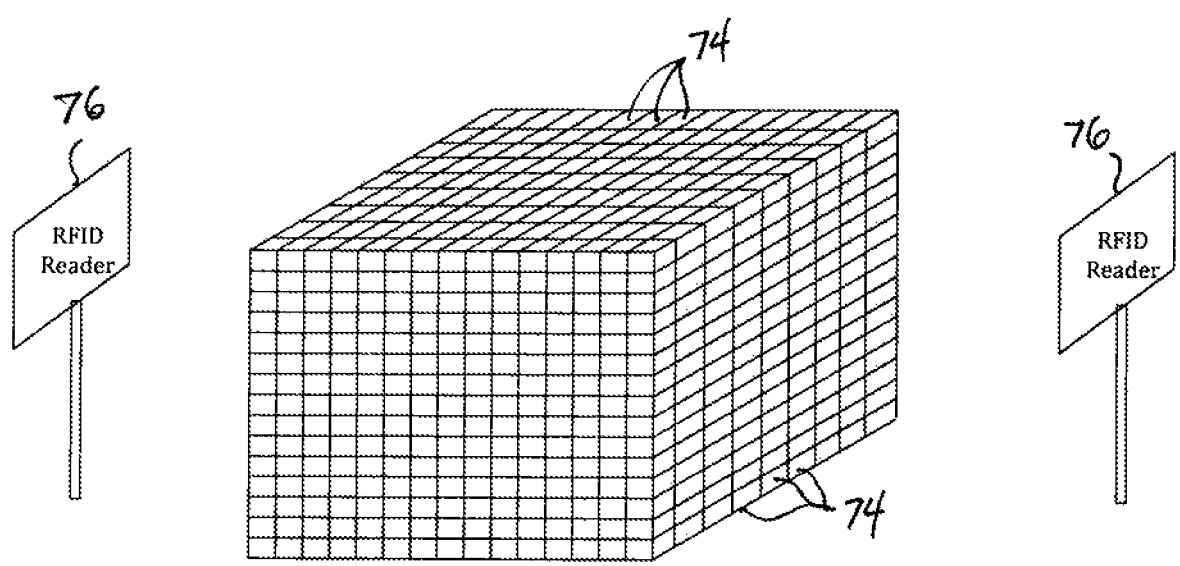
FIG. 12 is an isometric view showing an RFID read environment for which the RFID tag may be modified according to its expected position in the RFID read environment.

As shown in FIG. 12, it may be possible for RFID tags to be placed in different environments. FIG. 12 shows boxes 74 (articles) on which RFID tags are to be secured. Boxes 74 may be stored on a pallet and transported together from a manufacturing facility to retail facility, for example. To track individual boxes 74 during transportation, the entire group may be passed across an RFID screening station having one or more RFID readers 76. Thus, the target range for a particular RFID tag may be based on the expected environment in which that RFID tag is intended to encounter. RFID tags near the center of the group of boxes may require a greater target range compared to boxes that are closer to the RFID reader. The greater target range may account for the increased distance from the RFID reader and/or interference caused by boxes that surround the RFID tags near the center.

Referring again to FIG. 2, computer 22 is configured to associate RFID tag 10 with a position for storing an article on which RFID tag 10 is to be attached. The position of the article is relative to other articles (e.g., boxes 74 that surround the RFID tag) or relative to an RFID reader to be used later on the RFID tag 10 (e.g., RFID reader 76). Computer 22 is configured to determine the target range according to the position associated with the RFID tag.

TABLE II is an example lookup table that may be stored in computer 22. Computer 22 uses the lookup table to determine the target range according to the position associated with the RFID tag. The lookup table shows a relationship between the position and the target range (Rt). The lookup table may be developed empirically from many tests performed on identical RFID tags before the present RFID tag is modified. Computer 22 may store many lookup tables, each lookup table being for a particular RFID reading environment. For example, the lookup table of TABLE II may be used for the RFID reading environment of FIG. 12, and another lookup table may be used for a different RFID reading environment.

TABLE II

| Position | Target Range, Rt |
| --- | --- |
| 1. Facing RFID reader | 2 meters |
| 2. All other positions | 5 meters |
| 3. Center region of group of boxes | 6 meters |

For example, computer 22 may associate RFID tag 10 and all other RFID tags 10' to Position 3, in which case computer 22 determines that target range Rt should be 6 meters. Thereafter, computer 22 determines the configuration of modification element 18 according to Rt, as previously described. That is, computer 22 computes R using Rt and Ri, and then determines configuration characteristic L (and/or other configuration characteristics) from R. Applying Ri=4 meters to Equation 1 gives R=6−4=2 meters. Applying R=2 meters to the lookup table of TABLE I, computer 22 determines the configuration of modification element 18 to be L=30 mm for all the RFID tags on substrate 14.

In another example, computer may associate other RFID tags 10' to Position 2, in which case computer 22 determines that target range Rt should be 5 meters. Applying Ri=4 meters to Equation 1 gives R=5−4=1 meter. Applying R=1 meter to the lookup table of TABLE I, computer 22 determines the configuration of modification element 18 to be L=20 mm for other RFID tags 10'.

Figure 13:
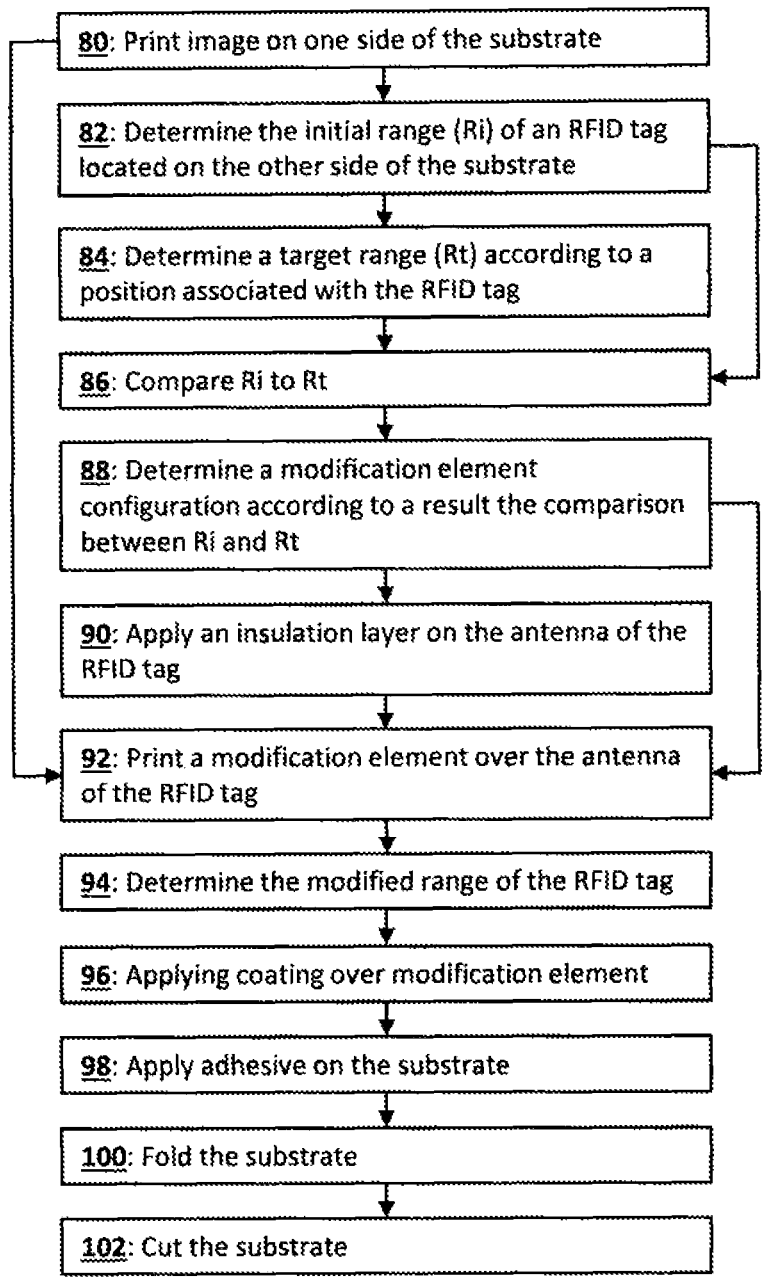
FIG. 13 is a flow diagram showing an example process for modifying the RFID tag.

FIG. 13 shows an example process for modifying an RFID tag (e.g., RFID tag 10 described above). The process may begin at block 92, where modification element (e.g., modification element 18 described above) is printed over the antenna of an RFID tag. Optionally, the process may begin at block 80 by printing image 50 on the substrate (e.g., substrate 14), and then the process goes to block 92 where the modification element on the other side of the substrate.

Optionally, the configuration for the modification element may be determined at block 88, and then the modification element is printed at block 92 according to the determined configuration. Optionally, the configuration may be determined by determining the initial range (Ri) of the RFID tag at block 82, for example by using pre-modification sensor 34. Next, Ri is compared to Rt at block 86, and then the configuration for the modification element is determined at block 88 according to a result of the comparison. The determined configuration may specify whether the modification element should make electrical contact with the antenna of the RFID tag. If there should be electrical contact, the process may proceed to block 92 to print the modification element. If there should be no electrical contact, the process may proceed to block 90 to apply an insulation layer (e.g., layer 70) over the antenna (if an insulation layer is not already present), and then proceed to block 92 to print the modification element.

The target range (Rt) may be predetermined. If Rt is not predetermined, Rt may be determined at block 84 according to a position associated with the RFID tag. The position may be for an article (e.g., box 74) on which the RFID tag is to be secured later. The position of the article may be relative to an RFID reader (e.g., RFID reader 76) and/or relative to other articles. Thereafter, the process proceeds to blocks 86, 88, 90, and 92 as previously described.

After the modification element is printed, a coating (e.g., coating 56) is applied on the modification element at block 96. The coating may contact the chip and/or antenna of the RFID tag if an insulation layer is not present on the chip and/or antenna.

Optionally at block 98, an adhesive (e.g., adhesive 58) is applied on the substrate. Next at block 100, the substrate is folded so that the chip, the antenna, and the modification element are disposed between two portions of the substrate. Thereafter, the substrate may be cut at block 102. If multiple RFID tags are present on the substrate, cutting will separate the RFID tags from each other.

Optionally, the modified range of the RFID tag may be determined at block 94 after the modification element is printed. This may be performed for quality control purposes. For example, post-modification sensor 38 may to determine the modified range. In alternative aspects, block 94 may be moved directly after any of blocks 96, 98, 100, and 102. In alternative aspects, the modified range of the RFID tag may be performed while the RFID tag is secured to an article (e.g., box 74), and an RFID reader (e.g., RFID reader 76) may be used to confirm that the modified range of the RFID tag is sufficient.

FIGS. 1-4 and 8-11 show one type of passive RFID tag. It is contemplated that other types of passive RFID tags may be modified according to the method and system described herein. It is also contemplated that modification of range by printing a modification element may be formed for semi-passive and active RFID tags.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. A method for modifying at least one RFID tag comprising a chip on a first side of a substrate and an antenna configured to transmit data from the chip, the RFID tag having an initial transmission range, the method comprising:
   modifying the RFID tag to have a modified transmission range, the modifying performed by printing a modification element over the antenna of the RFID tag, the modified transmission range being greater than or less than the initial transmission range.

2. The method of claim 1, wherein the modification element comprises metal or graphite.

3. The method of claim 1, wherein the modification element is made of an electrically conductive material that, when printed over the antenna, makes contact with the antenna such that the modified transmission range is greater than the initial transmission range.

4. The method of claim 1, wherein the modification element is made of an electrically conductive material that, when printed over the antenna, makes contact with the antenna or shields a portion of the antenna from radio waves such that the modified transmission range is less than the initial transmission range.

5. The method of claim 1, further comprising:
   determining the initial transmission range before the modifying of the RFID tag, by using a pre-modification sensor to induce a response from the RFID tag; and
   determining the modified transmission range after the modifying of the RFID tag, by using the pre-modification sensor or a post-modification sensor to induce a response from the RFID tag.

6. The method of claim 5, further comprising, before the modifying of the RFID tag:
   comparing, by a computer, the determined initial transmission range to a target transmission range; and
   determining, by the computer, a configuration of the modification element according to a result of the comparing of the initial transmission range to the target transmission range,
   wherein the printing of the modification element is performed according to the determined configuration.

7. The method of claim 6, wherein:
   the RFID tag is associated with a position for storing an article on which the RFID tag is to be attached; and
   the method further comprises, before the comparing of the initial transmission range to the target transmission range, determining the target transmission range according to the position associated with the RFID tag, the determining performed by the computer.

8. The method of claim 1, further comprising, after the modifying of the RFID tag:
   folding the first side of the substrate onto itself such that the chip, the antenna, and the modification element are between two portions of the substrate.

9. The method claim 8, further comprising, before the folding of the first side of the substrate:
   applying a coating on the first side of the substrate such that a bottom surface of the coating covers and contacts the chip, the antenna, and the modification element; and
   applying an adhesive on the first side of the substrate,
   wherein after the folding of the first side of the substrate, the adhesive is on a top surface of the coating.

10. The method of claim 8, wherein:
    the method further comprises printing, on a second side of the substrate opposite the first side, an image that corresponds to identification information associated with the RFID tag, the printing performed before the folding of the first side of the substrate;
    the folding of the first side of the substrate causes the image on the second side of the substrate to cover an area occupied by the chip, the antenna, and the modification element on the first side of the substrate; and the method further comprises storing the identification information on the chip before or after the modifying of the RFID tag.

11. The method of claim 1, wherein:
the RFID tag and other RFID tags are disposed on the first side of the substrate during the modifying of the RFID tag, each of the other RFID tags having a respective initial transmission range,
the method further comprises modifying each of the other RFID tags, while disposed on the first side of the substrate, to have a respective modified transmission range, the modifying performed by printing a respective modification element on a respective antenna of each of the other RFID tags, the respective modified transmission range being greater than or less than the respective initial transmission range.

12. The method of claim 11, further comprising, after the modifying of the RFID tag and the other RFID tags:
folding the first side of the substrate onto itself such that the RFID tag and the other RFID tags are disposed between two portions of the substrate; and
cutting the substrate to separate each of the RFID tag and the other RFID tags.

13. A system for modifying at least one RFID tag secured on a substrate, the RFID tag having a chip on a first side of the substrate and an antenna configured to transmit data from the chip, the RFID tag having an initial transmission range, the system comprising:
a first printer configured to receive the RFID tag secured on the substrate; and
a computer configured to control the first printer to modify the RFID tag, while secured on the substrate, to have a modified transmission range by instructing the first printer to print a modification element over the antenna of the RFID tag, the modified transmission range being greater than or less than the initial transmission range.

14. The system of claim 13, wherein the first printer is configured to print the modification element using a material that comprises metal or graphite.

15. The system of claim 13, wherein the first printer stores electrically conductive material, and the computer is configured to control the first printer to print the electrically conductive material, as the modification element contacting the antenna, such that modified transmission range is greater than the initial transmission range.

16. The system of claim 13, wherein the first printer stores electrically conductive material, and the computer is configured to control the first printer to print the electrically conductive material, as the modification element contacting the antenna or shielding a portion of the antenna from radio waves, such that modified transmission range is less than the initial transmission range.

17. The system of claim 13, further comprising:
one or more sensors configured to induce a first response from the RFID tag before the RFID tag is modified by the first printer, determine the initial transmission range based on the first response, induce a second response from the RFID tag after the RFID tag is modified by the first printer, and determine the modified transmission range based on the second response.

18. The system of claim 17, wherein:
the computer stores a target transmission range and is configured to compare the determined transmission initial range to the target transmission range before the RFID tag is modified;
the computer determines a configuration of the modification element according to a result of the comparison of the initial transmission range to the target transmission range,
the computer controls the first printer to print the modification element over the antenna of the RFID tag according to the determined configuration.

19. The system of claim 18, wherein:
the computer is configured to associate the RFID tag with a position for storing an article on which the RFID tag is to be attached; and
the computer is configured to determine the target transmission range according to the position associated with the RFID tag, the determination being made before the computer compares the initial transmission range to the target transmission range.

20. The system of claim 13, further comprising:
a folding mechanism configured to fold the first side of the substrate onto itself such that the chip, the antenna, and the modification element are between two portions of the substrate.

* * * * *